United States Patent Office 3,590,074
Patented June 29, 1971

3,590,074
CHLOR-METHYL-ISOPROPYL-PHENYL-N-METHYL CARBAMATE
Rudolf Heiss, Rueckersdorf, Ernst Bocker, Leverkusen, Bernhard Homeyer, Opladen, and Ingeborg Hammann, Cologne, Germany, assignors to Farbenfabriken Bayer Aktiengesellschaft, Leverkusen, Germany
No Drawing. Filed Aug. 1, 1968, Ser. No. 749,263
Claims priority, application Germany, Aug. 7, 1967, F 53,157
Int. Cl. C07c *101/12*
U.S. Cl. 260—479  1 Claim

ABSTRACT OF THE DISCLOSURE 2-chloro-4-methyl-5-isopropyl-phenyl - N - methyl carbamate which possesses insecticidal properties and which may be produced by commercial methods.

---

The present invention relates to and has for its objects the provision for the particular new compound 2-chloro-4 - methyl-5-isopropyl-phenyl-N-methyl carbamate which possesses pesticidal, especially insecticidal, properties, active compositions in the form of mixtures of such compound with solid and liquid dispersible carrier vehicles, and methods for producing such compound and for using such compound in a new way, especially for combating insects, with other and further objects becoming apparent from a study of the within specification and accompanying examples.

It is already known that O,O-diethyl-O-(p-nitrophenyl)-thionophosphate (A) can be used for the control of insects. This phosphoric acid ester is suitable for the control not only of the usual insects which infest above-the-ground parts of plants but also of insects which attack the plants from the soil.

Also known as insecticides are carbamates such as m-methyl-p-dimethylamino-phenyl-N-methyl carbamate (B) and 1-isopropyl-3-methyl-pyrazol-5-yl-N-dimethyl carbamate (C).

It has been found in accordance with the present invention that the particular new compound 2-chloro-4-methyl-5-isopropyl-phenyl-N-methyl carbamate, i.e. 3-isopropyl-4-methyl-6-chloro-phenyl-N-methyl carbamate, having the formula

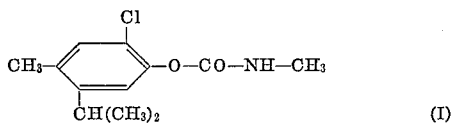

exhibits strong pesticidal, especially insecticidal, properties.

It has been furthermore found in accordance with the present invention that versatile and smooth processes for the production of the particular new chloro-methyl- and isopropyl-substituted phenyl-N-methyl carbamate of Formula I above in favorable yields may be provided, which comprise reacting the corresponding 2-chloro-4-methyl-5-isopropyl-phenol having the formula

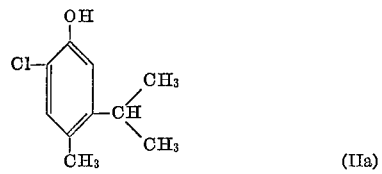

(a) With methylisocyanate having the formula C=C=N—CH$_3$ (IIb), or (b) In a first step, by conversion with an excess of phosgene into the corresponding chloroformic acid ester (IIaa) and by reacting the latter, in a second step, with methyl amine having the formula NH$_2$—CH$_3$ (IIc), or (c) In a first step, with an approximately ½ molar amount of phosgene to give the corresponding bis-(5-isopropyl - 4-methyl-2-chloro-phenyl)-carbonate (IIaaa) and by reacting the latter, in a second step, i.e. by split-up, with methyl amine having the formula NH$_2$—CH$_3$ (IIc).

Surprisingly, the active compound according to the present invention shows a higher insecticidal activity than the above-mentioned, previously known, phosphoric acid ester (A) and carbamates (B) and (C). Moreover, the active compound according to the present invention possesses a much longer duration of activity in the soil than the previously known phosphoric acid ester.

Therefore, the use of the active compound according to the invention as an insecticide, in particular for the control of noxious soil insects, represents an enrichment of the art.

The course of the reaction according to process (a) above can be represented by the following equation.

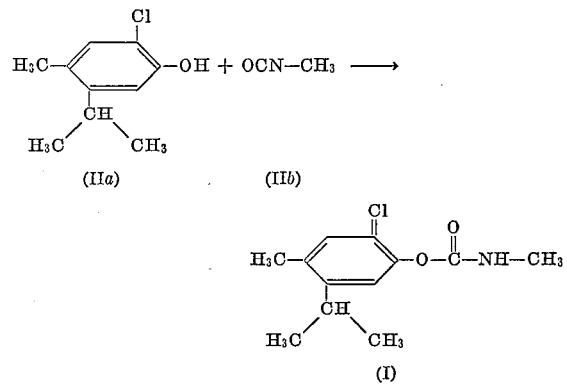

This reaction can optionally be carried out in an inert solvent. Suitable for this purpose are for example hydrocarbons, such as benzine and benzene or ethers, such as dioxan. It is, however, also possible to react the components directly in the absence of solvents. The reaction is accelerated by the addition of a tertiary amine, for example triethyl amine. The reaction temperatures can be varied within a fairly wide range. In general, however, the work is carried out at substantially between about 20 to 80° C.

The reaction course of the second step of process (b) above is represented by the following equations:

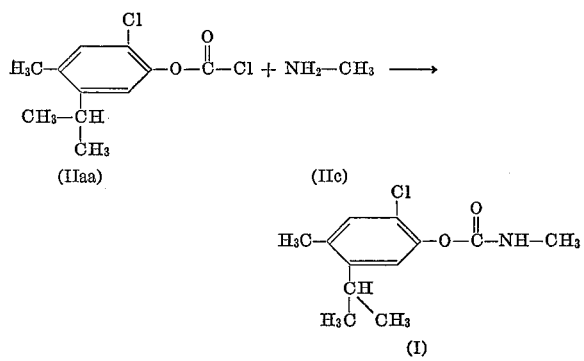

In the first step, the 5-isopropyl-4-methyl-2-chlorophenol (IIa) is expediently converted into the chloroformic acid ester (IIaa) with an excess of phosgene, preferably in the presence of inert solvents, such as aromatic hydrocarbons. In order to bind the hydrochloric acid which is formed, the reaction is desirably carried out in the presence of a base. The base, preferably alkali metal hydroxide, is generally added portionwise, for example continuously dropwise. The pH value should remain not greater than 7. The reaction temperatures are usually within a range substantially between about −10 to +10° C.; the temperature is preferably kept below 0° C. In the second step, the chloroformic acid ester (IIaa) is reacted with the approximately equivalent amount of methyl amine (IIc). The work is carried out expediently in the presence of inert solvents, such as aromatic and aliphatic hydrocarbons, and ethers, for example dioxan. The reaction temperatures can again be varied within a certain range. In general, they are substantially between about −10 to +10° C.

The reaction course of the second step of the reaction of process (c) can be represented by the following equations:

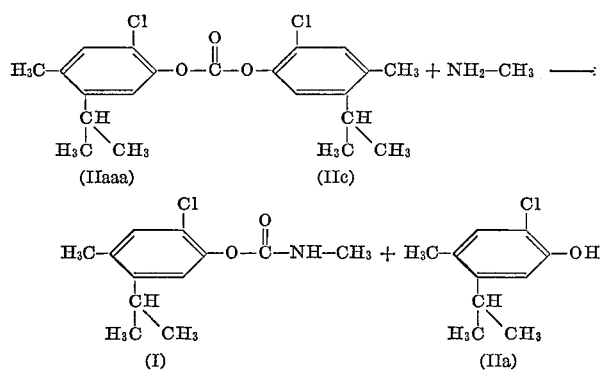

According to process (c), in the first step the 5-isopropyl-4-methyl-2-chloro-phenol (IIa) is reacted with the approximately ½ molar amount of phosgene. The work is carried out preferably in the presence of an inert solvent. To bind the hydrochloric acid concerned, the reaction is desirably carried out in the presence of a base. The base, preferably alkali metal hydroxide, may be added to the reactants. The pH value is preferably 8.5–7.5. The temperatures can in this case too be varied within a fairly wide range; preferably, such temperatures are substantially between about 20 to 60° C.

The bis-(5-isopropyl-4-methyl-2-chloro-phenyl)-carbonate (IIaaa) which is formed in the first step is split up with methyl amine (IIc). This work is preferably accomplished without a solvent. The most favorable reaction temperatures are substantially between about −10 and +20° C.

The 5-isopropyl-4-methyl-2-chloro-phenol used as starting material is still new, but can be prepared according to known methods from the known 3-isopropyl-4-methyl-phenol. Thus, this phenol can be chlorinated with an equimolar amount of sulfuryl chloride. This work is done preferably without a solvent. The reaction temperatures can be varied within a fairly wide range; preferably the temperature may be substantially between about 10 to 50° C.

Advantageously, the active compound according to the present invention exhibits strong insecticidal effects, with relatively low toxicity toward warm-blooded animals and lower phytotoxicity. The effects set in rapidly and are long-lasting. The instant artive compound can therefore be used with very good results for the control of noxious sucking and biting insects and Diptera and, in particular, soil insects.

To the sucking insects contemplated herein there belong, in the main, aphids, such as the green peach aphid (*Myzus persicae*), the bean aphid (*Doralis fabae*); scales, such as *Aspidiotus hederae, Lecanium hesperidum, Pseudococcus maritimus; Thysanoptera,* such as *Hercinothrips femoralis*; and bugs, such as the beet bug (*Piesma quadrata*) and the bed bug (*Cimex lectularius*); and the like.

With the biting insects contemplated herein there are classed, in the main, butterfly caterpillars, such as *Plutella maculipennis, Lymantria dispar*; beetles, such as granary weevils (*Sitophilus granarius*), the Colorado beetle (*Leptinotarsa decemlineata*), but also species living in the soil, such as the wireworms (*Agriotes* sp.) and larvae of the cockchafer (*Melolantha melolantha*); cockroaches, such as the German cockroach (*Blatella germanica*); Orthoptera, such as the house cricket (*Gryllus* domesticus); termites, such as Reticulitermes; Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*) and mosquitoes, such as the yellow fever mosquito (*Aedes aegypti*); and the like.

To the soil insects contemplated herein there belong, in the main, the rootworms (Diabrotica species), wireworms (Agriotes species, Conoderus species), cockchafers (Melolontha species), cutworms (Agrotis species, Euxoa species), maggots of the cabbage rootfly (*Phorbia brassicae*), of the onion fly (*Phorbia antiqua*), of the carrot fly (*Psila rosae*), and of the wheat bulb fly (*Phorbia coarctata*); and the like.

The active compound according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compound with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and/or anionic emulsifying agents e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate etc.); and/or dispersing agents, such as lignin, sulfite waste liquors, methyl cellulose, etc.

Such active compound may be employed alone or in the form of mixtures with such solid and/or liquid dispersible carrier vehicles and/or with other known compatible active agents, especially plant protection agents, such as other insecticides, acaricides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.01–5%, preferably 0.005–0.1%, by weight of the mixture. Thus, the present invention contemplates over-all compositions which comprise mixtures of a dispersible carrier vehicle such as (1) a dispersible carrier solid, and/or (2) a dispersible carried liquid such as an inert organic solvent and/or water preferably including a carrier vehicle assistant, e.g. surface-active agent, such as an emulsifying agent and/or a dispersing agent, and an amount of the active compound which is effective for the purpose in question and which is generally between about 0.01–95%, and preferably 0.005–95%, by weight of the mixture.

The active compound can also be used in accordance with the well known ultra-low-volume process with good success, i.e. by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrer vehicles containing from about 40 to about 95% by weight of active compound or even the 100% active substance alone, e.g. about 40–100% by weight of the active compound.

In particular, the present invention contemplates methods of selectively controlling or combating pests, i.e. insects, and more particularly, methods of combating insects which comprise applying to at least one of (a) such insects and (b) their habitat, i.e. the locus to be protected, a corerspondingly combative amount, i.e. an insecticidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

For the control of soil insects, the active compound is expediently applied by watering or scattering over the plants or by spraying or scattering over the whole area, or over strips, of the field.

When used as seed dressing agent, the active compound is used alone, but preferably in solid or liquid carrier vehicle formulation, for dressing, e.g. dry dressing, wet dressing or slurry dressing.

In particular, regardless of the method of application, the amount of active compound applied is generally between about 100 to 2000 g. of active compound per hectare, depending upon the nature of application in the field.

The present invention therefore also contemplates crops protected from damage by insects by being grown in areas in which immediately prior to and/or during the time of growing the instant active compound has been applied alone or in admixture with a solid or liquid carrier vehicle as noted above.

The present invention further contemplates seed when dressed with the instant compound alone or in admixture with a solid or liquid carrier vehicle as noted above.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compound of the present invention is illustrated without limitation by the following examples:

EXAMPLE 1

Critical concentration test/soil insects

Test insect: *Diabrotica balteata*
Solvent: 40 parts dimethyl formamide
Emulsifier: 10 parts benzylhydroxydiphenyl polyglycol ether.

To produce a suitable preparation of the particular active compound, 1 part by weight of such active compound is mixed with the stated amount of solvent, the stated amount of emulsifier is then added and the resulting concentrate is diluted with water to the desired final concentration.

The active compound preparation is intimately mixed with soil which is heavily infested with the test insects. The concentration of the active compound in the preparation is of practically no importance; only the amount by weight of active compound per unit volume of soil, given in p.p.m. (e.g. mg./liter), is decisive. The soil is filled into pots and the pots are left to stand at ambient or room temperature. After 48 hours, the degree of effectiveness of the given active compound is determined as a percentage by counting the dead and living test insects. The degree of effectiveness is 100% when all the test insects are killed; it is 0% when exactly as many test insects are alive as in the case of the control.

The particular active compounds tested, the amounts applied and the results obtained can be seen from the following Table 1.

TABLE 1
[Critical concentration test/soil insects]

| Active compound | Degree of effectiveness as a percentage with amounts [1] applied of— | | | | | |
| --- | --- | --- | --- | --- | --- | --- |
| | 20 | 10 | 5 | 2.5 | 1.25 | 0.625 |
| (A)  (known) | 100 | 100 | 50 | 0 | 0 | 0 |
| (I) 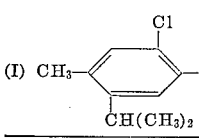 | 100 | 100 | 100 | 100 | 100 | 95 |

[1] Parts per million.

EXAMPLE 2

Soil insects outdoors test (duration of effect)

Test insect: *Diabrotica balteata*
Solvent: 40 parts dimethyl formamide
Emulsifier: 10 parts benzylhydroxydiphenyl polyglycol ether.

To produce a suitable preparation of the particular active compound, 1 part by weight of such active compound is mixed with the stated amount of solvent, the stated amount of emulsifier is then added, and the resulting concentrate is diluted with water to the desired final concentration.

The active compound preparation is applied outdoors to small plots of half a square meter and worked in to a depth of about 10 cm.

Soil samples are taken at intervals of 30 days and infested with larvae of *Diabrotica balteata*. After 48 hours there is determined in each case the number of live and dead animals and from this the degree of effectiveness is determined as described in Example 1.

The particular active compounds, the amounts applied and the results achieved can be seen from the following Table 2.

TABLE 2
[Soil insects outdoors test (duration of effect)]

| Active compound and amount applied | Degree of effectiveness as a percentage in days after application— | | | | |
|---|---|---|---|---|---|
| | 31 | 62 | 90 | 119 | 152 |
| (A) O,O-diethyl-O-(p-nitro-phenyl) thionophosphate (known): | | | | | |
| 2 kg. active compound/hectare | 100 | 90 | 30 | 20 | 0 |
| 8 kg. active compound/hectare | 100 | 100 | 95 | 90 | 20 |
| (I) Active compound according to the invention: | | | | | |
| 1 kg. active compound/hectare | 100 | 100 | 100 | 100 | 100 |

EXAMPLE 3

Myzus test (contact action)

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the given active compound preparation until dripping wet.

After the specified period of time, the degree of destruction is determined as a percentage: 100% means that all the aphids are killed whereas 0% means that none of the aphids are killed.

The particular active compounds, their concentrations, the evaluation time and the results obtained can be seen from the following Table 3.

TABLE 3
[Plant-damaging insects]

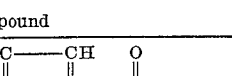

| Active compound | Concentration of active compound in percent | Degree of destruction in percent after 24 hours |
|---|---|---|
| (B) (CH₃)₂N—⟨ ⟩—O—C(=O)—NH—CH₃ (with CH₃ substituent) (known) | 0.1 | 100 |
| | 0.02 | 95 |
| | 0.004 | 0 |
| (I) CH₃—⟨ ⟩—O—C(=O)—NH—CH₃ (with Cl and CH(CH₃)₂ substituents) | 0.1 | 100 |
| | 0.02 | 100 |
| | 0.004 | 99 |
| | 0.0008 | 50 |

EXAMPLE 4

Plutella test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the active compound preparation until dew moist and are then infested with caterpillars of the diamond-back moth (*Plutella maculipennis*).

After the specified period of time, the degree of destruction is determined as a percentage: 100% means that all the caterpillars are killed whereas 0% means that none of the caterpillars are killed.

The particular active compounds, their concentrations, the evaluation time and the results obtained can be seen from the following Table 4.

TABLE 4
[Plant-damaging insects]

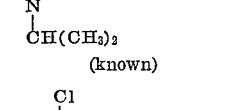

| Active compound | Concentration of active compound in percent | Degree of destruction in percent after 3 days |
|---|---|---|
| (C) CH₃—C(=N—)—CH=C(O—C(=O)—N(CH₃)₂) with N—CH(CH₃)₂ (known) | 0.1 | 20 |
| | 0.02 | 0 |
| (I) CH₃—⟨ ⟩—O—C(=O)—NH—CH₃ (with Cl and CH(CH₃)₂ substituents) | 0.1 | 100 |
| | 0.02 | 100 |
| | 0.004 | 100 |

The production of the instant compound is illustrated without limitation by the following further examples:

EXAMPLE 5

184.5 g. 5-isopropyl - 4 - methyl - 2 - chloro-phenol, 250 ml. ligroin and 3–5 drops of triethyl amine are placed as a solution in a three-necked flask of 1 liter capacity which is provided with stirrer, thermometer and reflux condenser. 62.5 ml. methyl isocyanate are then added dropwise within about 15 minutes, during which the temperature rises slightly. Stirring is effected for 2 hours, during which the solution heats up further. The temperature is kept below 40° C. by suitable cooling. After some time the carbamate precipitates as a white crystalline product. It is filtered off with suction at 20° C., washed briefly with ligroin and dried at 50° C. in a vacuum. 205 g. 5 - isopropyl - 4 - methyl - 2 - chlorophenyl-N-methyl carbamate with a melting point of 112° C. are obtained. The yield is 85% of the theory.

EXAMPLE 6

184.5 g. 5-isopropyl - 4 - methyl - 2 - chloro-phenol, 175 ml. distilled water, 100 ml. benzene and 54.5 g. phosgene are placed in a three-necked flask of 1 liter capacity which is equipped with stirrer, Y-piece, thermometer, gas introducing tube and reflux condenser provided with bubble counter. A solution of sodium hydroxide is now introduced at from 0 to −5° C., with moderate stirring, in such a manner that the pH value of the emulsion which is formed does not exceed the neutral point and that the temperature is maintained with an ice/sodium chloride mixture (strongly exothermic reaction). After about 3 hours the reaction is complete.

The benzene phase is separated from the aqueous phase, washed 3 times with about 100 ml. of water, dried over sodium sulfate, and distilled. 229 g. of the desired chloroformic acid ester of 5-isopropyl - 4 - methyl-2-chloro-phenol are obtained. The yield is 89% of the theory. Boiling point 110–112° C. at 12 mm. Hg.

229 g. of said chloroformic acid ester are dissolved in 400 ml. benzene in a 1 liter glass beaker which is provided with stirrer, thermometer and dropping funnel and which stands in an ice/sodium chloride bath. 186 ml. of 29.5% methyl amine solution are then added dropwise at 0° C. within about 20 minutes. Stirring is then effected for 3 hours at the same temperature. The carbamate which is formed precipitates. It is filtered off with suction, washed a few times with cold benzene (or preferably with ligroin) and dried at 50° C. in a vacuum. 190 g. 5-isopropyl - 4 - methyl - 2 - chloro-phenyl-N-methyl carbamate are obtained. The yield is 85% of the theory. M.P.=112° C.

EXAMPLE 7

184.5 g. 5-isopropyl - 4 - methyl - 2 - chloro-phenol, 175 ml. of distilled water and 100 ml. benzene are placed in a three-necked flask of 1 liter capacity which is provided with stirrer, Y-piece, thermometer, gas introduction tube and a reflux condenser equipped with bubble counter. 105 g. of 42% solution of sodium hydroxide are then added dropwise, with stirring, and 54.5 g. of phosgene are so introduced that a slight excess of alkali is always present and that, by suitable cooling, the temperature cannot rise above 20° C. After completion of the introduction and allowing to stand for a short time, the heavier, aqueous phase is separated and discarded.

The benzene layer is washed briefly with water, freed from benzene and distilled over a 10-cm. glass column which is filled with Raschig rings. 158 g. bis-(5-isopropyl-4 - methyl - 2 - chloro-phenyl)-carbamate are obtained; the yield is 80% of the theory. Boiling point 150–170° C. at 0.02 mm. Hg.

142 g. bis-(5-isopropyl - 4 - methyl - 2 - chlorophenyl)-carbonate which are dissolved in 80 ml. benzene, and 140 ml. of distilled water, are placed in an 800 ml. glass beaker which is provided with stirrer, thermometer and dropping funnel and which stands in an ice-water bath. 29.5% methyl amine solution (209 ml.) are then introduced at 0 to 5° C. within 15 minutes, with stirring. Stirring is then continued for 2 hours at the same temperature. During this time, part of the carbamate precipitates. The benzene layer is separated from the aqueous solution, extracted three times with, in each case, 100 ml. of 2 N solution of sodium hydroxide, as well as twice with, in each case, 100 ml. of distilled water, and diluted with 300 ml. ligroin. Further carbamate is precipitated by the dilution. It is filtered off with suction, washed briefly with ligroin and dried at 50° C. in a vacuum. Further carbamate can be separated from the mother liquor at 0° C. by concentration to a saturation limit of 40° C. (at 13 mm. Hg); this further carbamate has the purity of the material first obtained. A total of 98 g. of 5-isopropyl - 4 - methyl - 2 - chloro-phenyl-N-methyl carbamate is obtained; the yield is 90% of the theory; M.P. 112° C. From the combination of the aqueous reaction solution with the extracts the liberated phenol is deacidified, separated and distilled. 81 g. are obtained, corresponding to 49% of the charge.

The 5-isopropyl - 4 - methyl - 2 - chloro-phenol used as starting material can be prepared as follows:

400 g. 3-isopropyl - 4 - methyl-phenol are placed in a three-necked flask of 1 liter capacity which is equipped with stirrer, thermometer, Y-piece, dropping funnel and a reflux condenser provided with a bubble counter. 360 g. sulfuryl chloride are then added dropwise within half an hour at 25–30° C., with stirring. Vigorous evolution of gas sets in. The temperature is maintained by suitable external cooling. After completion of the introduction, the temperature is raised to 50° C. within 1 hour and maintained until no more gas escapes. The reaction product is then cooled to 20° C., taken up in 500 ml. chloroform, washed neutral with water in several portions, dried over sodium sulfate and distilled over a 60 cm. glass column which is filled with Raschig rings. 142 g. 5-isopropyl - 4 - methyl - 2 - chloro-phenol with a boiling point of 122 to 124° C. at 12 mm. Hg are obtained. That is approximately 30% of the theory.

It will be realized that the foregoing compound contemplated by the present invention possesses the desired selective insecticidal properties for combating insects and that such compound has not only a very slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention which is to be limited only by the scope of the appended claim.

What is claimed is:

1. 2 - chloro-4-methyl-5-isopropylphenyl-N-methyl carbamate having the formula

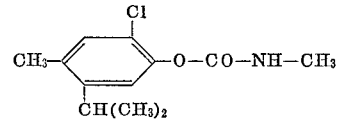

References Cited

UNITED STATES PATENTS 3,131,215  4/1964  Lemin _____ 260—479
3,341,401  9/1967  Kilsheimer et al. _____ 260—479

JAMES A. PATTEN, Primary Examiner

U.S. Cl. X.R.

260—463, 623; 424—300